US010077703B2

(12) United States Patent
Murata et al.

(10) Patent No.: US 10,077,703 B2
(45) Date of Patent: Sep. 18, 2018

(54) EXHAUST HEAT RECOVERY DEVICE STRUCTURE

(71) Applicant: TOYOTA JIDOSHA KABUSHIKI KAISHA, Toyota-shi, Aichi-ken (JP)

(72) Inventors: Toshio Murata, Toyota (JP); Masakazu Shinkai, Toyota (JP); Takeshi Oya, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 15/209,347

(22) Filed: Jul. 13, 2016

(65) Prior Publication Data
US 2017/0022871 A1 Jan. 26, 2017

(30) Foreign Application Priority Data

Jul. 21, 2015 (JP) ................. 2015-144353

(51) Int. Cl.
F01N 5/02 (2006.01)
F01N 3/04 (2006.01)
F01N 3/10 (2006.01)
F01N 3/02 (2006.01)

(52) U.S. Cl.
CPC ............. F01N 5/02 (2013.01); F01N 3/0205 (2013.01); F01N 3/04 (2013.01); F01N 3/10 (2013.01); F01N 2230/04 (2013.01); F01N 2240/02 (2013.01); F01N 2530/18 (2013.01); Y02T 10/16 (2013.01); Y02T 10/20 (2013.01)

(58) Field of Classification Search
CPC . F01N 5/02; F01N 3/0205; F01N 3/04; F01N 3/10; F01N 2230/04; F01N 2240/02; F01N 2530/18; Y02T 10/16; Y02T 10/20

USPC .......................................... 60/320
See application file for complete search history.

(56) References Cited

FOREIGN PATENT DOCUMENTS

| JP | S63-38622 U | 3/1988 |
| JP | 2006-161593 A | 6/2006 |
| JP | 2007-285141 A | 11/2007 |
| JP | 2007-303425 A | 11/2007 |
| JP | 2007285141 A | * 11/2007 |
| JP | 2007303425 A | * 11/2007 |
| JP | 2012-246836 A | 12/2012 |

(Continued)

OTHER PUBLICATIONS

Aug. 15, 2017 Office Action issued in Japanese Patent Application No. 2015-144353.

Primary Examiner — Laert Dounis
Assistant Examiner — Kelsey Stanek
(74) Attorney, Agent, or Firm — Oliff PLC

(57) ABSTRACT

An exhaust heat recovery device structure that includes: an exhaust heat recovery device main body that is disposed at an inner side of a floor tunnel formed at a vehicle transverse direction central portion of a floor panel, the exhaust heat recovery device main body carrying out heat exchange between cooling water and gas that is generated at an internal combustion engine of a vehicle; and a metal pipe that extends-out from the exhaust heat recovery device main body, the metal pipe being connected to one end of a resin hose whose another end is connected to the internal combustion engine, the connected portion that connects the metal pipe with the resin hose being provided to the metal pipe further toward a vehicle lower side than the exhaust heat recovery device main body, is provided.

4 Claims, 3 Drawing Sheets

(56) References Cited

FOREIGN PATENT DOCUMENTS

| JP | 2012246836 A | * | 12/2012 |
| JP | 2014-095362 A | | 5/2014 |
| JP | 2016-121557 A | | 7/2016 |

* cited by examiner

EXHAUST HEAT RECOVERY DEVICE STRUCTURE

CROSS-REFERENCE TO RELATED APPLICATION

This application is based on and claims priority under 35 USC 119 from Japanese Patent Application No. 2015-144353 filed on Jul. 21, 2015, which is incorporated by reference herein.

BACKGROUND

Technical Field

The present invention relates to an exhaust heat recovery device structure.

Related Art

There is known a technique in which an exhaust heat recovery device is connected to an exhaust pipe that discharges gas generated by an internal combustion engine, and, due to heat exchange being carried out between cooling water and the gas, the cooling water is heated and warming-up of the internal combustion engine is promoted. As a structure of such an exhaust heat recovery device, Japanese Patent Application Laid-Open (JP-A) No. 2006-161593 discloses a structure in which an exhaust heat recovery device and an engine (an internal combustion engine) are connected by a heater warm water path, and cooling water is circulated between the exhaust heat recovery device and the engine.

SUMMARY

Structures in which an internal combustion engine and an exhaust heat recovery device are connected by a hose that is made of resin (a resin hose) are generally known. In such a structure, the resin hose is connected to a metal pipe that extends-out from the main body of the exhaust heat recovery device. Here, because gas that is high-temperature flows through the exhaust pipe, the upper side of the exhaust pipe path becomes high temperature. Further, because gas flows through the interior of the exhaust heat recovery device as well, the connected portion of the resin hose and the metal pipe becomes high temperature. Therefore, there is room for improvement from the standpoint of suppressing heat damage of the resin hose.

In view of the above-described circumstances, an object of the present invention is to provide an exhaust heat recovery device structure that can suppress heat damage of a resin hose.

An exhaust heat recovery device structure relating to a first aspect of the present invention includes: an exhaust heat recovery device main body that is disposed at an inner side of a floor tunnel formed at a vehicle transverse direction central portion of a floor panel, the exhaust heat recovery device main body carrying out heat exchange between cooling water and gas that is generated at an internal combustion engine of a vehicle; and a metal pipe that extends-out from the exhaust heat recovery device main body, the metal pipe being connected to one end of a resin hose whose another end is connected to the internal combustion engine, the connected portion that connects the metal pipe with the resin hose being provided to the metal pipe further toward a vehicle lower side than the exhaust heat recovery device main body.

In the exhaust heat recovery device structure relating to the first aspect, the exhaust heat recovery device main body is disposed at the inner side of the floor tunnel, and the metal pipe extends-out from this exhaust heat recovery device main body. Further, the other end portion of the resin hose, whose one end portion is connected to the internal combustion engine, is connected to the metal pipe. Here, the connected portion of the metal pipe with the resin hose is provided further toward the vehicle lower side than the exhaust heat recovery device main body. Due thereto, it is easy for the connected portion of the metal pipe and the resin hose to be hit by wind at the time when the vehicle travels, as compared with a structure in which the metal pipe and the resin hose are connected further toward the vehicle upper side than the bottom surface of the exhaust heat recovery device main body. Namely, the connected portion of the metal pipe and the resin hose can be cooled effectively by traveling wind. Note that, here, "the connected portion that is connected with the resin hose is provided further toward a vehicle lower side than the exhaust heat recovery device main body" is not limited to a structure in which the entire connected portion is provided further toward the vehicle lower side than the exhaust heat recovery device main body. Namely, it is a concept that includes a structure in which a portion of the connected portion is provided further toward the vehicle lower side than the exhaust heat recovery device main body.

In an exhaust heat recovery device structure relating to a second aspect, in the first aspect, a catalytic converter is connected to an exhausting direction upstream side of the exhaust heat recovery device main body, and a muffler is connected to an exhausting direction downstream side of the exhaust heat recovery device main body, and the connected portion is provided further toward a vehicle upper side than a bottom surface of at least one of the catalytic converter and the muffler.

In the exhaust heat recovery device relating to the second aspect, the resin hose and the metal pipe are connected at the vehicle upper side of the bottom surface of at least one of the catalytic converter and the muffler. Due thereto, at the time of traveling on bad roads or the like for example, the connected portion of the metal pipe and the resin hose interfering with the road surface can be suppressed.

In an exhaust heat recovery device structure relating to a third aspect, in the first or second aspect, the internal combustion engine is disposed further toward a vehicle front side than the exhaust heat recovery device main body, and the connected portion is inclined toward a vehicle lower side while heading toward a vehicle front side.

In the exhaust heat recovery device structure relating to the third aspect, the connected portion of the metal pipe with the resin hose is inclined toward the vehicle lower side while heading toward the vehicle front side. Due thereto, in a structure in which the exhaust heat recovery device is disposed at the inner side of a floor tunnel, or the like, the resin hose can be connected to the metal pipe from the vehicle lower side where the work space is wide.

As described above, the exhaust heat recovery device structure relating to the first aspect has the excellent effect that heat damage of the resin hose can be suppressed.

The exhaust heat recovery device structure relating to the second aspect has the excellent effect that the connected state of the resin hose and the metal pipe can be maintained good, while heat damage of the resin hose is suppressed.

The exhaust heat recovery device structure relating to the third aspect has the excellent effect that the work of connecting the resin hose and the metal pipe can be carried out efficiently.

DETAILED DESCRIPTION

Figure 1:
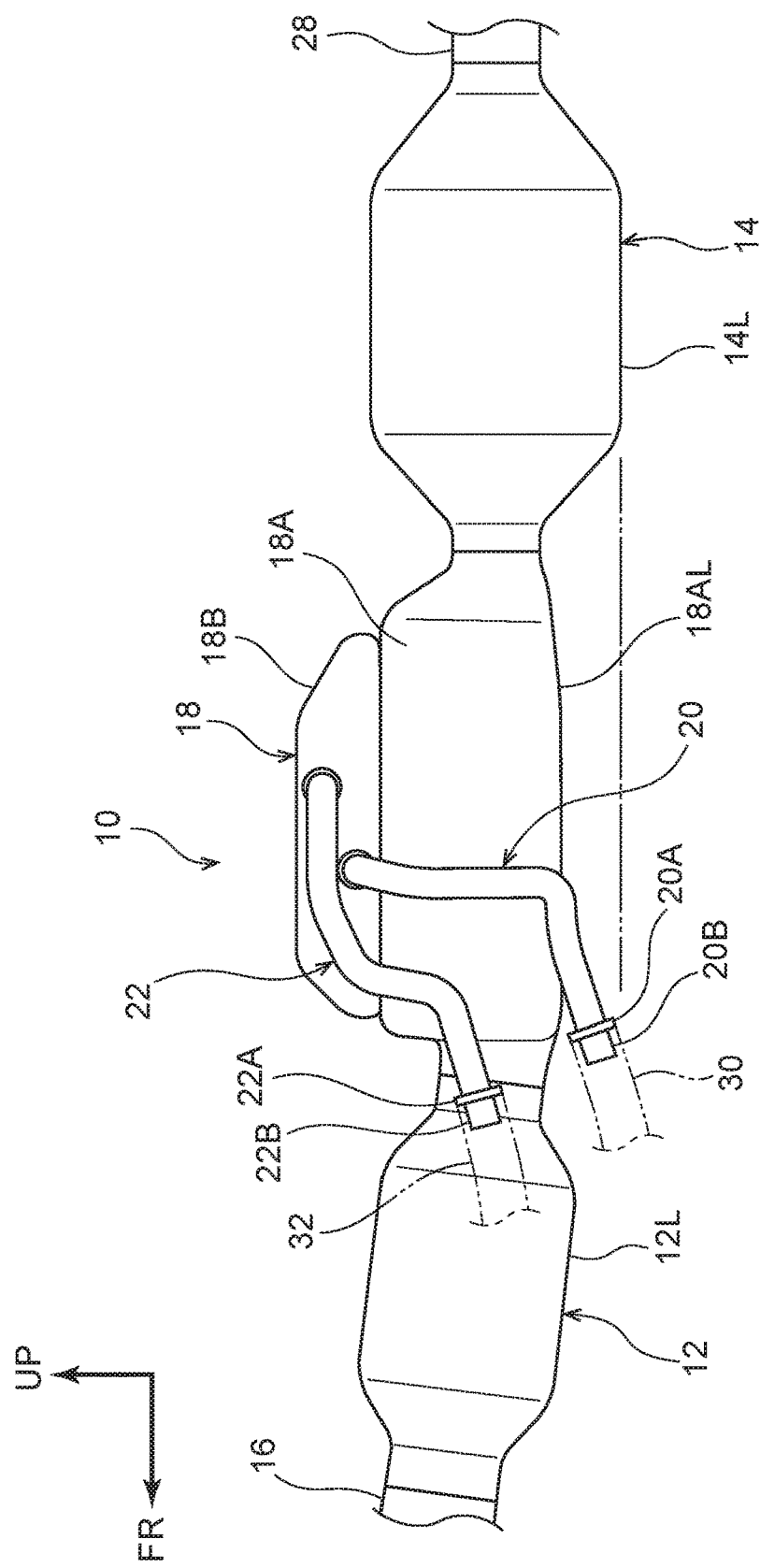
FIG. 1 is a side view showing an exhaust heat recovery device structure relating to an embodiment.
Figure 2:
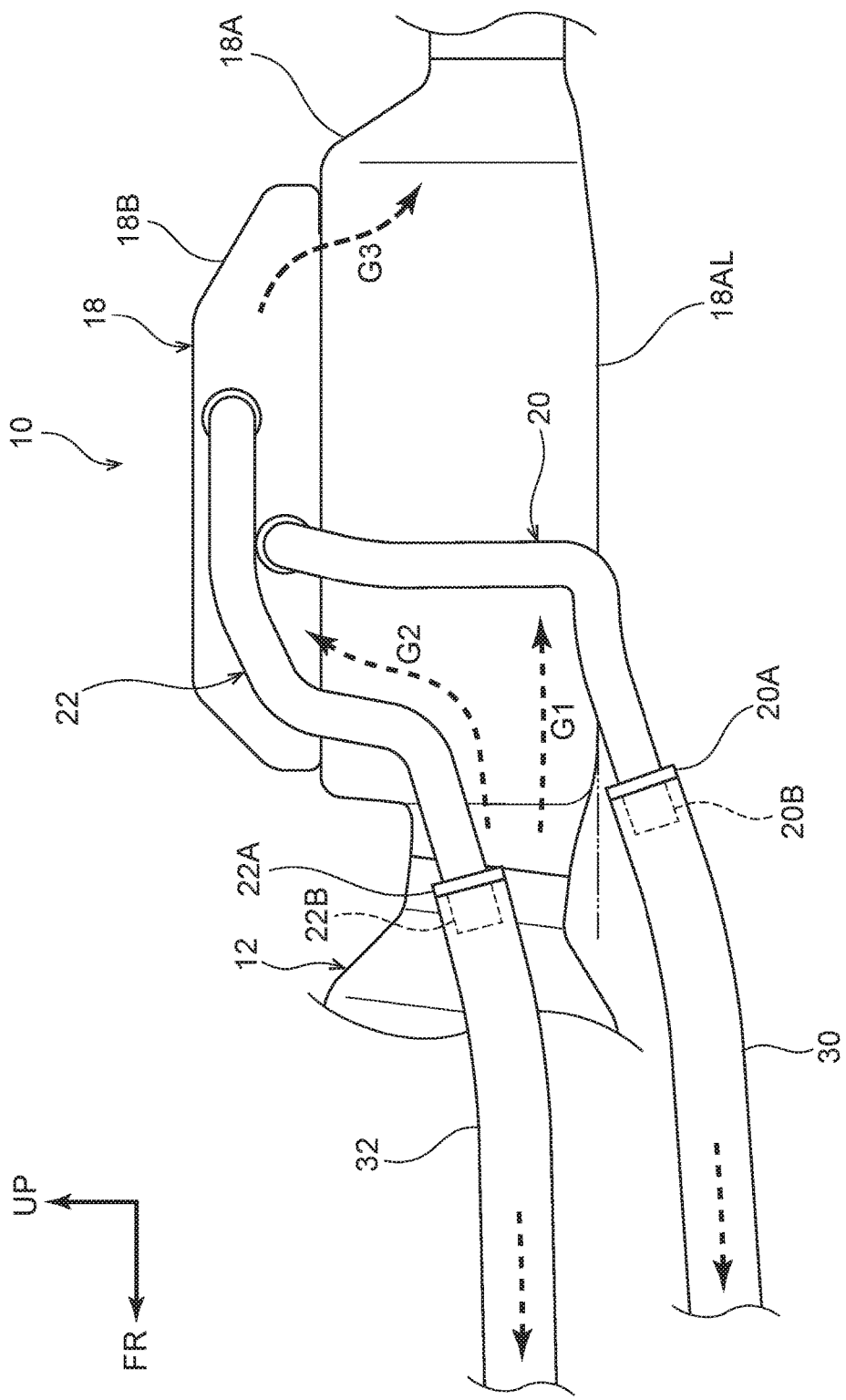
FIG. 2 is an enlarged side view showing, in an enlarged manner, main portions of the exhaust heat recovery device structure relating to the embodiment.
Figure 3:
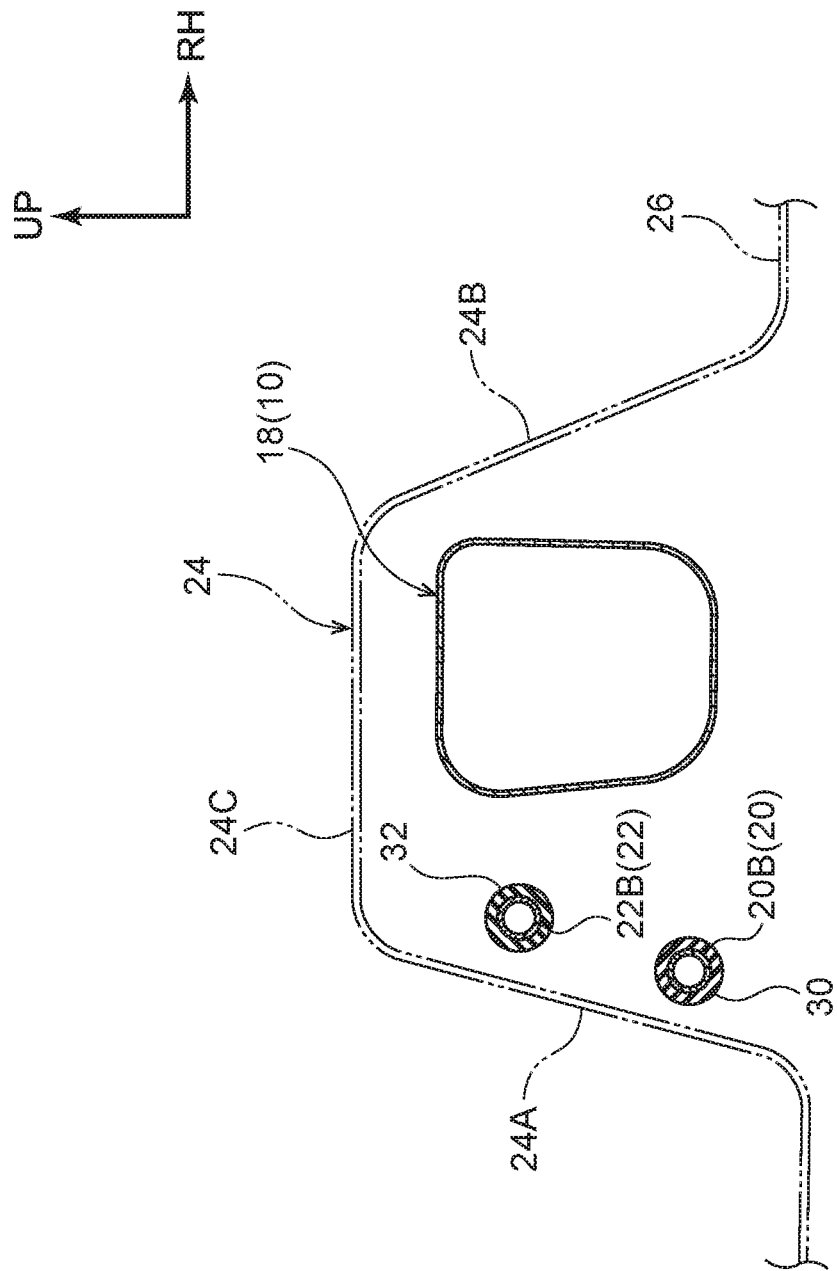
FIG. 3 is a cross-sectional view in which an exhaust heat recovery device relating to the embodiment is seen from the vehicle rear side, and is a drawing showing the positional relationship between the exhaust heat recovery device and a floor tunnel.

An exhaust heat recovery device structure relating to an embodiment of the present invention is described on the basis of FIG. 1 through FIG. 3. Note that arrow FR that is shown appropriately in the respective drawings indicates the vehicle frontward side, arrow UP indicates the vehicle upper side, and arrow RH indicates a vehicle transverse direction outer side. Further, in the following description, when longitudinal, vertical and left-right directions are used without being specified, they refer to the longitudinal of the vehicle longitudinal direction, the vertical of the vehicle vertical direction, and the left and right when facing in the advancing direction.

Overall Structure of Exhaust Heat Recovery Structure

As shown in FIG. 1, an exhaust system that includes an exhaust heat recovery device structure relating to the present embodiment is structured to include an exhaust heat recovery device 10, a catalytic converter 12 and a muffler 14. Further, the catalytic converter 12, the exhaust heat recovery device 10 and the muffler 14 are disposed in that order from the vehicle front side (the exhausting direction upstream side), and these parts are connected in the vehicle longitudinal direction. Moreover, an unillustrated engine that serves as an internal combustion engine is disposed further toward the vehicle front side than the catalytic converter 12, and the engine and the catalytic converter 12 are connected in the vehicle longitudinal direction by an exhaust pipe 16.

The catalytic converter 12 is a tubular member that extends in the vehicle longitudinal direction and whose both end portions are open. The catalytic converter 12 is formed in a shape in which the diameter thereof gradually narrows from the central portion thereof toward the both end portions. Moreover, a catalyst support for purifying gas is provided at the interior of the catalytic converter 12. The catalyst support is formed from a material that is electrically-conductive and is rigid. An electrically-conductive ceramic, an electrically-conductive resin, a metal and the like are examples of the catalyst support. Note that the catalyst support is not limited to this, and another catalyst support may be used provided that it is a material that can purify substances (carbon and the like) that are within the gas (exhaust) that flows through the interior of the catalytic converter 12.

The exhaust heat recovery device 10 is connected to the vehicle rear side (the exhausting direction downstream side) of the catalytic converter 12. The muffler 14 that is for reducing exhaust noise is connected to the vehicle rear side of the exhaust heat recovery device 10. The muffler 14 is a member that is tubular, and extends in the vehicle longitudinal direction, and whose both end portions are open. Further, the muffler 14 is formed in a shape in which the diameter thereof gradually narrows from the central portion thereof toward the both end portions. An exhaust pipe 28 is connected to the rear end portion of the muffler 14.

The exhaust heat recovery device 10 that is disposed between the catalytic converter 12 and the muffler 14 is structured to include mainly an exhaust heat recovery device main body 18, and an introduction pipe 20 and a lead-out pipe 22 that serve as metal pipes and that extend-out from the exhaust heat recovery device main body 18.

Further, as shown in FIG. 3, the exhaust heat recovery device 10 of the present embodiment is disposed at the inner side of a floor tunnel 24. Concretely, the floor tunnel 24 is formed due to the vehicle transverse direction central portion of a floor panel 26, that structures the vehicle floor portion, being made to bulge-out toward the vehicle upper side. The floor tunnel 24 has a left wall portion 24A at the vehicle left side, a right wall portion 24B at the vehicle right side, and a top wall portion 24C that connects the upper end of the left wall portion 24A and the upper end of the right wall portion 24B. Here, because the left wall portion 24A and the right wall portion 24B respectively are inclined toward the vehicle transverse direction outer sides from the vehicle upper sides thereof toward the vehicle lower sides thereof, the lower portion of the floor tunnel 24 is wider in the vehicle transverse direction than the upper portion.

As shown in FIG. 2, the exhaust heat recovery device main body 18 of the exhaust heat recovery device 10 has a main pipe portion 18A that structures a main flow path through which the gas, that flows-in from the catalytic converter 12, flows substantially rectilinearly in the vehicle longitudinal direction, and a bypass pipe portion 18B that is provided above the main pipe portion 18A.

The main pipe portion 18A structures the lower portion of the exhaust heat recovery device main body 18, and is formed in a tubular shape that extends in the vehicle longitudinal direction and whose both end portions are open. On the other hand, the bypass pipe portion 18B structures the upper portion of the exhaust heat recovery device main body 18. Through-holes, that are not illustrated and that communicate with the main pipe portion 18A, are formed in the bypass pipe portion 18B at two places that are at the front end portion and the rear end portion thereof.

Here, an unillustrated valve is provided at the interior of the main pipe portion 18A, and there is a structure in which, due to this valve being opened and closed, the flow rates of the gases that flow through the main pipe portion 18A and the bypass pipe portion 18B can be adjusted. For example, in a state in which the valve of the main pipe portion 18A is completely open, the majority of the gas, that has flowed-into the exhaust heat recovery device main body 18 from the catalytic converter 12, advances directly and passes-through the interior of the main pipe portion 18A (refer to arrow G1 of FIG. 2).

On the other hand, in the state in which the valve of the main pipe portion 18A is completely closed, the main flow path of the main pipe portion 18A is closed-off. Therefore, the majority of the gas, that has flowed-into the exhaust heat recovery device main body 18 from the catalytic converter 12, passes-through the unillustrated communication hole and flows through the bypass pipe portion 18B (refer to arrow G2 in FIG. 2). Then, the gas returns to the main pipe portion 18A from the communication hole at the rear end side of the bypass pipe portion 18B, and flows to the muffler 14 (arrow G3 in FIG. 2). In this way, the flow rates of the gases that flow through the main pipe portion 18A and the bypass pipe portion 18B can be adjusted by controlling the valve. Note that, in the present embodiment, an automatic opening/closing valve that operates by heat is used as the valve, but the valve is not limited to this. For example, the valve may be driven by an unillustrated driving mechanism.

In this case, the driving mechanism may be electrically connected to an ECU that is a control section, and may open and close the valve on the basis of signals from the ECU.

An unillustrated flow path for cooling water is disposed at the interior of the bypass pipe portion 18B. Therefore, the cooling water that flows at the interior of the bypass pipe portion 18B is heated by the gas that flows-through the bypass pipe portion 18B. Namely, heat exchange is carried out between the cooling water and the gas.

Here, the introduction pipe 20 and the lead-out pipe 22 extend-out from the left side surface of the bypass pipe portion 18B. The introduction pipe 20 and the lead-out pipe 22 are formed integrally with the exhaust heat recovery device main body 18, and are connected to the unillustrated flow path for cooling water that is at the interior of the bypass pipe portion 18B.

The lead-out pipe 22 extends-out from the bypass pipe portion 18B at a position that is further toward the vehicle rear side than the introduction pipe 20. The lead-out pipe 22 extends along the left side surface of the exhaust heat recovery device main body 18 toward the vehicle front side and the vehicle lower side. A flange 22A, that is annular and that projects-out toward the radial direction outer side from the outer surface of the lead-out pipe 22, is formed at the distal end portion of the lead-out pipe 22. Further, a connected portion 22B that is connected with a resin hose 32 is provided at the lead-out pipe 22, further toward the distal end side than the flange 22A. Here, the connected portion 22B is inclined toward the vehicle lower side while heading toward the vehicle front side.

The resin hose 32 is formed from a resin material that is flexible, and one end portion of the resin hose 32 is connected to the unillustrated engine. The other end portion of the resin hose 32 is inserted, from the vehicle front side, into the connected portion 22B of the lead-out pipe 22, and abuts the flange 22A. Further, the resin hose 32 is prevented from coming-off by being fastened to the connected portion 22B by an unillustrated fastener or the like. Due to the lead-out pipe 22 and the resin hose 32 being connected in this way, the cooling water that is led-out from the bypass pipe portion 18B to the lead-out pipe 22 can be sent to the engine.

On the other hand, the introduction pipe 20 extends along the left side surface of the exhaust heat recovery device main body 18 toward the vehicle lower side. The introduction pipe 20 is bent toward the vehicle front side and the vehicle lower side, from a vicinity of the lower end portion of the main pipe portion 18A. A flange 20A, that is annular and that projects-out toward the radial direction outer side from the outer surface of the introduction pipe 20, is formed at the distal end portion of the introduction pipe 20. Further, a connected portion 20B that is connected with a resin hose 30 is provided at the introduction pipe 20, further toward the distal end side than the flange 20A. Here, the connected portion 20B is inclined toward the vehicle lower side while heading toward the vehicle front side.

The resin hose 30 is formed from a resin material that is flexible, and one end portion of the resin hose 30 is connected to the unillustrated engine. The other end portion of the resin hose 30 is inserted, from the vehicle front side, into the connected portion 20B of the introduction pipe 20, and abuts the flange 20A. Further, the resin hose 30 is prevented from coming-off by being fastened to the connected portion 20B by an unillustrated fastener or the like. Due to the introduction pipe 20 and the resin hose 30 being connected in this way, cooling water that has passed-through the engine can be introduced from the resin hose 30 via the introduction pipe 20 into the bypass pipe portion 18B, and the cooling water is circulated between the engine and the exhaust heat recovery device 10.

Here, the connected portion 20B of the introduction pipe 20 with the resin hose 30 is provided further toward the vehicle lower side than the exhaust heat recovery device main body 18. Therefore, the resin hose 30 and the introduction pipe 20 are connected further toward the vehicle lower side than the exhaust heat recovery device main body 18.

Further, as shown in FIG. 1, the connected portion 20B of the introduction pipe 20 with the resin hose 30 is provided further toward the vehicle upper side than a bottom surface 14L of the muffler 14. Therefore, the resin hose 30 and the introduction pipe 20 are connected further toward the vehicle upper side than the bottom surface 14L of the muffler 14. Moreover, in the present embodiment, the resin hose 32 and the lead-out pipe 22 are connected further toward the vehicle upper side than a bottom surface 12L of the catalytic converter 12 and the bottom surface 14L of the muffler 14. Namely, the connected portion 22B of the lead-out pipe 22 with the resin hose 32 is positioned further toward the vehicle upper side than the bottom surface 14L of the muffler 14.

Operation and Effects

Operation and effects of the exhaust heat recovery device structure relating to the present embodiment are described next.

In the present embodiment, the warming-up operation after starting-up of the engine can be promoted due to heat exchange being carried out between cooling water and gas by the exhaust heat recovery device 10. Namely, as shown in FIG. 2, due to the unillustrated valve being closed and the main flow path of the main pipe portion 18A being closed-off, gas is made to flow into the bypass pipe portion 18B, and heat exchange is carried out between cooling water and the gas. Due thereto, the cooling water that flows through the bypass pipe portion 18B interior is heated, and warming-up can be promoted. Further, after warm-up, due to the valve being opened and the main flow path of the main pipe portion 18A being opened, heat exchange between the cooling water and the gas is suppressed, and the engine is cooled.

Further, in the present embodiment, the connected portion 20B of the introduction pipe 20 with the resin hose 30 is provided further toward the vehicle lower side than the exhaust heat recovery device main body 18. Due thereto, the resin hose 30 and the introduction pipe 20 are connected further toward the vehicle lower side than the exhaust heat recovery device main body 18. Therefore, it is easy for the connected portion 20B of the introduction pipe 20 with the resin hose 30 to be hit by wind at the time when the vehicle travels, as compared with a structure in which the resin hose 30 and the introduction pipe 20 are connected further toward the vehicle upper side than a bottom surface 18AL of the exhaust heat recovery device main body 18. Namely, the effect of cooling the connected portion 20B by traveling wind can be improved. As a result, heat damage of the resin hose 30 can be suppressed. Further, in a structure in which the exhaust heat recovery device 10 is provided at the interior of the floor tunnel 24 as in the present embodiment, the upper portion side of the floor tunnel 24 becomes high temperature due to the exhaust heat. Here, due to the connected portion 20B of the introduction pipe 20 with the resin hose 30 being provided further toward the vehicle lower side than the exhaust heat recovery device main body 18, heat damage can be suppressed even in a case in which the exhaust heat recovery device 10 is disposed at the inner side of the floor tunnel 24.

Moreover, as shown in FIG. 1, due to the connected portion 20B of the introduction pipe 20 with the resin hose 30 being provided further toward the vehicle upper side than the bottom surface 14L of the muffler 14, the resin hose 30 and the introduction pipe 20 are connected further toward the vehicle upper side than the bottom surface 14L of the muffler 14. Due thereto, at the time of traveling on a bad road, the muffler 14 contacts the road surface before the connected portion 20B contacts the road surface, and therefore, the connected portion 20B interfering with the road surface can be suppressed. Further, because the resin hose 32 and the lead-out pipe 22 are connected further toward the vehicle upper side than the bottom surface 12L of the catalytic converter 12 and the bottom surface 14L of the muffler 14, the connected portion 20B of the introduction pipe 20 with the resin hose 30 interfering with the road surface can similarly be suppressed.

Further, in the present embodiment, the connected portion 20B of the introduction pipe 20 with the resin hose 30 and the connected portion 22B of the lead-out pipe 22 with the resin hose 32 are inclined toward the vehicle lower side while heading toward the vehicle front side. Due thereto, at the time of connecting the resin hose 30 and the resin hose 32 to the introduction pipe 20 and the lead-out pipe 22 respectively after the exhaust heat recovery device 10 has been assembled into the vehicle body, the resin hose 30 and the resin hose 32 can be smoothly connected to the introduction pipe 20 and the lead-out pipe 22 from the vehicle front side. Namely, at the time when a worker carries out the connecting work at the lower surface side of the vehicle body, it is easier for the worker to connect the resin hose 30 in a case in which the connected portion 20B and the connected portion 22B are inclined toward the vehicle lower side while heading toward the vehicle front side, than in a case in which the connected portion 20B and the connected portion 22B are inclined toward the vehicle upper side while heading toward the vehicle front side.

Moreover, as shown in FIG. 3, in the present embodiment, the exhaust heat recovery device 10 is disposed at the inner side of the floor tunnel 24, and the lower portion of the floor tunnel 24 is wider in the vehicle transverse direction than the upper portion. Due thereto, due to the connected portion 20B and the connected portion 22B facing toward the vehicle front side, the resin hose 30 and the resin hose 32 can be connected from the vehicle lower side where the space is wide, and the work efficiency can be improved.

Although the exhaust heat recovery device structure relating to an embodiment of the present invention has been described above, these embodiments may be combined appropriately, and the present invention can of course be implemented in various forms within a scope that does not depart from the gist thereof. For example, in the present embodiment, as shown in FIG. 2, the connected portion 22B of the lead-out pipe 22 with the resin hose 32 is provided further toward the vehicle upper side than the bottom surface 18AL of the exhaust heat recovery device main body 18, but the present invention is not limited to this. Namely, provided that at least one of the connected portion 20B of the introduction pipe 20 with the resin hose 30, and the connected portion 22B of the lead-out pipe 22 with the resin hose 32, is positioned lower than the exhaust heat recovery device main body 18, it can contribute to the suppressing of heat damage. Therefore, there may be a structure in which the connected portion 22B of the lead-out pipe 22 with the resin hose 32 is provided further toward the vehicle lower side than the exhaust heat recovery device main body 18. Further, there may be a structure in which both the connected portion 20B and the connected portion 22B are provided further toward the vehicle lower side than the exhaust heat recovery device main body 18. However, by providing the connected portion 22B, that is at the lead-out pipe 22 side, further toward the vehicle upper side than the connected portion 20B that is at the introduction pipe 20 side as in the present embodiment, the temperature of the cooling water, that is high-temperature and that has been involved in the heat exchange at the exhaust heat recovery device 10, dropping due to the effect of traveling wind can be suppressed. Therefore, from the standpoint of maintaining the temperature of the cooling water after the heat exchange and promoting warming-up, a structure in which the connected portion 22B is positioned further toward the vehicle upper side than the connected portion 20B is preferable.

Further, in the present embodiment, the flange 20A is formed at the introduction pipe 20, and the flange 22A is formed at the lead-out pipe 22, but the present invention is not limited to this and may be applied to an introduction pipe that does not have the flange 20A and the flange 22A. In this case as well, effects that are similar to those of the present embodiment can be obtained by providing the region, that corresponds to the connected portion 20B, further toward the vehicle lower side than the exhaust heat recovery device main body 18.

Moreover, although the introduction pipe 20 and the lead-out pipe 22 are formed integrally with the exhaust heat recovery device main body 18 in the present embodiment, the present invention is not limited to this. For example, the introduction pipe 20 and the lead-out pipe 22 may be prepared as separate bodies, and may respectively be fastened to the exhaust heat recovery device main body 18 by fasteners such as bolts or the like.

Further, in the present embodiment, the unillustrated valve that is provided at the main pipe portion 18A is opened and closed, and the flow rates of the gases that flow-through the main pipe portion 18A and the bypass pipe portion 18B are adjusted. However, the present invention is not limited to this. For example, a valve may be provided within the bypass pipe portion 18B. In this case, it suffices for there to be a structure that is such that, in a case in which heat exchange between the cooling water and the gas is not to be carried out, the valve is closed and gas does not flow to the bypass pipe portion 18B, and, in a case in which heat exchange is to be carried out, the valve is opened and gas flows to the bypass pipe portion 18B.

Moreover, in the present embodiment, the connected portion 20B of the introduction pipe 20 with the resin hose 30 is provided further toward the vehicle upper side than the bottom surface 14L of the muffler 14, and further toward the vehicle lower side than the catalytic converter 12. However, the present invention is not limited to this. For example, there may be a structure in which the catalytic converter 12 is disposed further toward the vehicle lower side than the position shown in FIG. 1, and the connected portion 20B is provided further toward the vehicle upper side than the bottom surface 12L of the catalytic converter 12. In this case, at the time when the vehicle is traveling forward, obstacles or the like on the road contact and are repelled by the catalytic converter 12, and therefore, such obstacles and the like interfering with the connected portion 20B can be suppressed effectively.

Further, in the present embodiment, a protector or the like for protecting the exhaust heat recovery device main body 18 is not provided. However, the present invention is not limited to this, and may be structured such that a protector is mounted to a portion of the bottom surface 18AL of the exhaust heat recovery device main body 18 and protects the exhaust heat recovery device main body 18 from the road surface. In this case, the protector is not included in the "exhaust heat recovery device main body 18" of the present invention. Namely, even in a structure in which the connected portion 20B is provided further toward the vehicle lower side than the exhaust heat recovery device main body 18 and further toward the vehicle upper side than the bottom surface of a protector, effects that are similar to those of the present embodiment can be obtained, and therefore, such a structure is included as an embodiment relating to the present invention.

What is claimed is:

1. An exhaust heat recovery device structure comprising:
   an exhaust heat recovery device main body that is disposed at an inner side of a floor tunnel formed at a central portion of a floor panel in a vehicle transverse direction of a vehicle, the exhaust heat recovery device main body performing heat exchange between cooling water and gas that is generated by an internal combustion engine of the vehicle, the exhaust heat recovery device main body including: (i) a main pipe portion forming a main flow path through which the gas flows, and (ii) a bypass pipe portion that is located above the main pipe portion in an up and down direction of the vehicle; and
   a metal pipe that extends-out from the bypass pipe portion of the exhaust heat recovery device main body, the metal pipe having a connected portion connected to one end of a resin hose whose another end is connected to the internal combustion engine, the connected portion being located below the bypass pipe portion of the exhaust heat recovery device main body in the up and down direction of the vehicle.

2. The exhaust heat recovery device structure of claim 1, wherein:
   a catalytic converter is connected to an exhausting direction upstream side of the exhaust heat recovery device main body, and a muffler is connected to an exhausting direction downstream side of the exhaust heat recovery device main body, and;
   the connected portion is located above a bottom surface of at least one of the catalytic converter and the muffler in the up and down direction of the vehicle.

3. The exhaust heat recovery device structure of claim 2, wherein:
   the exhaust heat recovery device main body is located rearward of the internal combustion engine in a front and rear direction of the vehicle; and
   the connected portion is inclined downward, in the up and down direction of the vehicle, toward a front side of the vehicle in the front and rear direction of the vehicle.

4. The exhaust heat recovery device structure of claim 1, wherein:
   the exhaust heat recovery device main body is located rearward of the internal combustion engine in a front and rear direction of the vehicle; and
   the connected portion is inclined downward, in the up and down direction of the vehicle, toward a front side of the vehicle in the front and rear direction of the vehicle.

* * * * *